United States Patent [19]

Smith et al.

[11] 4,361,080

[45] Nov. 30, 1982

[54] FLOOR FOR LAUTERING VESSELS

[75] Inventors: David K. Smith, Leven; Nigel Harlow, Cupar; Samuel W. Maxfield, Leven, all of Scotland

[73] Assignee: Henry Balfour & Company Ltd., Leven, Scotland

[21] Appl. No.: 170,230

[22] Filed: Jul. 18, 1980

[51] Int. Cl.³ .............................................. C12G 1/02
[52] U.S. Cl. .................................................. 99/277.1
[58] Field of Search ................... 99/277.1, 277.2, 278, 99/276, 277; 435/310, 317; 426/15; 210/293, 428

[56] References Cited

U.S. PATENT DOCUMENTS 2,262,863  11/1941  Schock ................................. 210/428
2,961,316  11/1960  Cook ..................................... 99/276
3,653,845   4/1972  Moravec .............................. 210/293

Primary Examiner—Robert W. Jenkins
Attorney, Agent, or Firm—Theodore B. Roessel; Roger Aceto; Robert J. Bird

[57] ABSTRACT

Disclosed is a real floor for a lauter tun comprising a plurality of elongated linear troughs, each trough extending unobstructed across the bottom of the vessel and each forming a relatively shallow upward opening V-shape. The elements making up the floor are shaped to provide the lauter tun floor with a circular profile.

1 Claim, 5 Drawing Figures

FLOOR FOR LAUTERING VESSELS

BACKGROUND OF THE INVENTION

The present invention relates to lauter tuns or tubs and like apparatus comprising a vessel for material to be treated with a floor provided with a discharge outlet.

A lauter tun is used in brewing for filtration and lautering of grain mash and includes a circular vessel for receiving the mash and a rotary lautering machine within the vessel, the vessel being provided with real and perforated false floors to facilitate drainage of liquid.

In one known type of lauter tun, an example of which is described in U.S. Pat. No. 2,262,863-Schock, the real floor has a series of annular concentric troughs of shallow V-form, which troughs are built up from a series of arcuate plate sections. The formation of these arcuate troughs by plate bending and joining is relatively difficult and expensive, and it has been necessary to use different sized troughs for tuns of varying size so that substantial standardization of the trough sections and the false floor has not been possible up till now. This has inconvenienced the batch manufacture of tuns and has added to the cost of apparatus.

SUMMARY OF THE INVENTION

It is an object of the present invention to obviate or mitigate these disadvantages.

According to the present invention a lauter tun or like apparatus includes a vessel for material to be treated with a floor provided with a discharge outlet, the floor comprising a series of parallel substantially linear troughs.

Preferably the troughs are of shallow V-form.

In a preferred embodiment the floor is formed from a series of individual linear elements joined along adjacent edges. These troughs can be shaped so that the floor has a circular profile.

An embodiment of the present invention will now be described by way of example with reference to the accompanying drawings.

DRAWINGS

FIG. 1 is a plan view of a prior art lauter tun floor of the type shown in U.S. Pat. No. 2,262,863.

DETAILED DESCRIPTION

Figure 1:
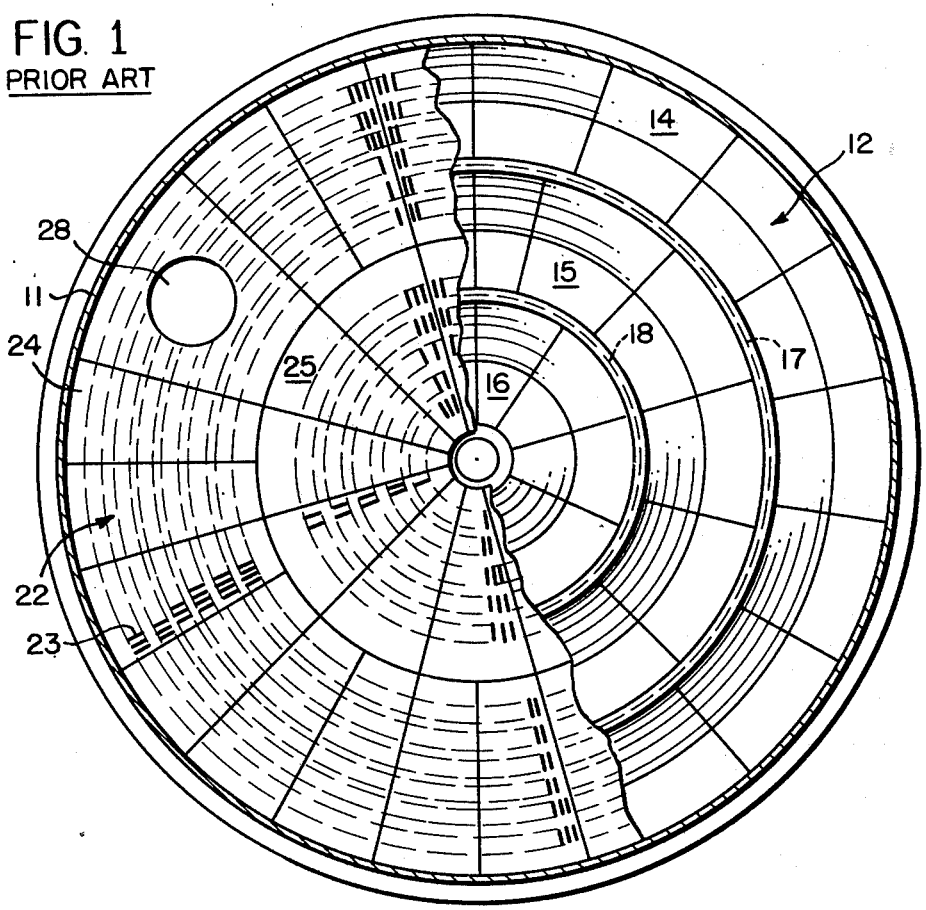
Figure 2:
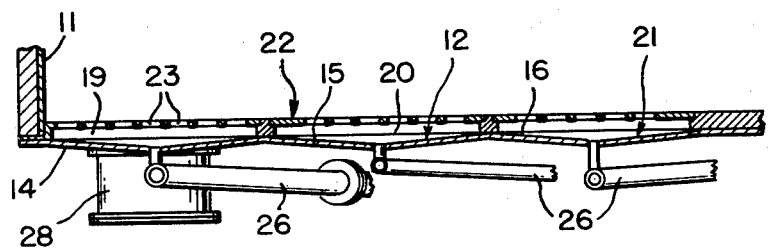
FIG. 2 is a cross-sectional side elevation view of the floor shown in FIG. 1.

The prior art lauter tun illustrated in FIGS. 1 and 2 has a cylindrical outer wall 11, a real bottom 12, and a false bottom 22 positioned above the real bottom 12. In operation, a grain bed is supported by the false bottom 22, and worked and loosened by a rotary lautering machine (not shown). Wort filters through the grain bed and through slots 23 in the false bottom 22. The wort collects in a space between the false bottom and the real bottom, and passes through a manifold 26 to a tank or grant (not shown).

When lautering has been completed, the rotary lautering machine sweeps the grain to one or more valve controlled spent grain discharges 28, which direct the grain to a grains removal system.

The false bottom 22 is supported above the real bottom 12 by annular support rings 17, 18 that divide the space between the bottoms 12, 22 into concentric annular compartments 19, 20, 21. The bottom of each of these compartments is a shallow V, which improves drainage of the wort from the compartments into the collection manifold.

The real bottom is formed of a series of arcuate or pie shaped plates 14, 15, 16, each of which has a shallow V cross-section in the radial direction. These plates define the annular V shaped channels in the real bottom 12.

The false bottom 22 is also formed of a series of arcuate plates 24, 25. These plates contain the slots 23 through which the wort passes into the annular wort collection compartments 19, 20, 21.

Figure 3:
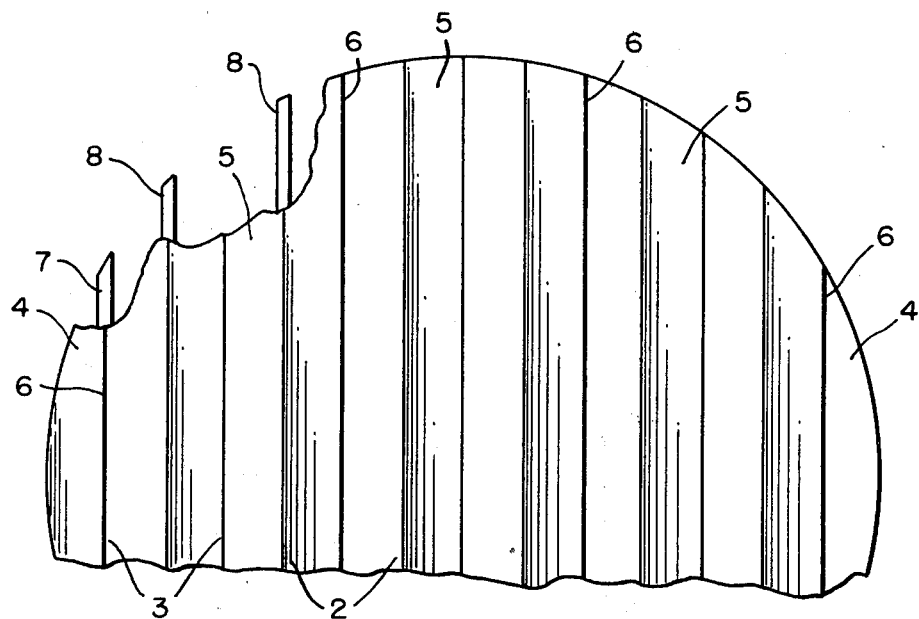
FIG. 3 is a plan view of a lauter tun floor according to this invention.
Figure 4:
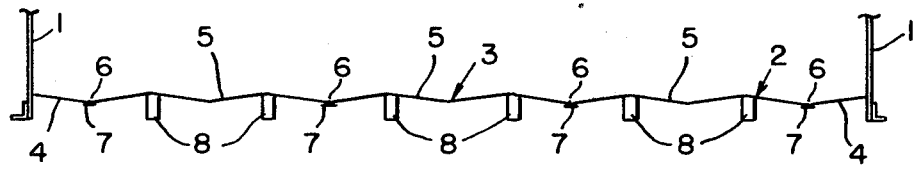
FIG. 4 is a cross-sectional side elevation view of the floor shown in FIG. 3.
Figure 5:
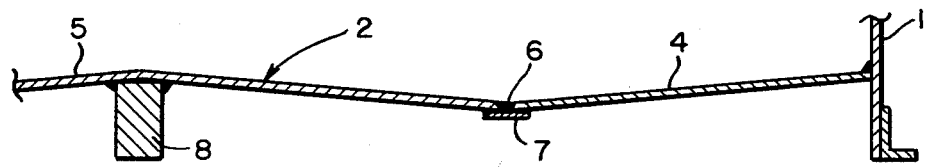
FIG. 5 is a detail, from the same vantage point as FIG. 2, to a larger scale.

The lauter tun shown in FIG. 3-5, which incorporate this invention, comprises a vessel having an annular wall 1 and a real floor 2 comprising a series of parallel linear troughs 3 of shallow V-form (see FIG. 4). These troughs are shaped so that the floor has a circular profile, with the periphery of the floor welded to wall 1. The floor 2 is constructed from a series of linear plate elements 4, 5, which are welded together along their adjoining edges, plates 4 being of plane form while plates 5 are corrugated. The plates 4, 5 can be dimensioned for ease of transport for on site erection. The plate weld joints 6 are reinforced by backing strips 7 and bottom support bars 8 are welded to the floor 2 beneath the upper creases or crests in the corrugated plates 5.

Discharge outlets (not shown) can be suitably located on the floor 2.

Conveniently a standard straight trough section of fixed width can be provided, and variation in size of the tun bottom can be achieved simply by welding together a greater or smaller number of these standard sized straight sections. As will be appreciated, this simplifies the batch production of tuns and assists the stocking of parts since basically only a single sized section need be used for the floor of tuns of varying size. In previous tuns having circular troughs, each size of tun generally required its own sizes of arcuate trough sections and this necessitated individual plate sizing and manufacture for each section to cater to the different section width, this width being dependent on the number of troughs or valleys employed in the tun.

Also, due to the use of straight trough sections of standard width, the manufacture of the false bottom for the tun can be considerably convenienced since it is possible to build the bulk of the floor (say 80%-90%) from plates of a standard size irrespective of the size of the tun, with only the remaining peripheral part of the false floor requiring particular sizing. Again, this facilitates batch production and stocking. In the previous tun with circular troughs of varying width for varying tun size, the false bottom plates, which are mainly supported on the tops of the troughs, had to be individually made to suit the tun sizing.

Further, the tun bottom according to the present invention will be as operationally effective as the previous arrangement. Indeed the present system should have the following additional benefits:

(a) The proposed method of formation by simple bending allows simple variation of the valley angles, or depth, to suit differing draining parameters.

(b) With straight troughs or valleys, collection of the run off material can be more accurately zoned, thus enabling greater control of run off over over discreet areas of the tun floor for uniformity of process and also allowing more discreet sampling facilities.

(c) The straight troughs or valleys also allow the use of straight collection pipes, flushout channels etc. which are of simpler construction than the circular units employed in the previous circular trough tuns and also allow a much simpler process for periodic major cleaning and servicing.

Modifications are of course possible. For example, the precise arrangement of the linear plate elements could be altered. It is submitted that the construction of the floor in the form of parallel linear troughs, particularly by simply joining plate elements, provides for considerable ease of construction in comparison with the previous annular concentric trough arrangement. It will be appreciated that the present invention could be used in treatment vessels other than lauter tuns. These and other modifications may be made within the scope of this invention, which is defined by the following claims.

We claim:

1. In a lauter tun or like vessel for containing material to be treated, the vessel having a perforated false bottom for draining liquid from the material being treated and a real floor including a discharge outlet below the false bottom for collecting the drained liquid, the improvement wherein:

(a) said real floor includes a plurality of elongated parallel linear troughs substantially identical in cross section, each of said troughs extending unobstructed across substantially the entire bottom of said vessel to facilitate access to said troughs from without said vessel for cleaning and the like, (b) each of said troughs forms in cross section a relatively shallow, upward opening V-shape for receiving liquid draining through said perforated false bottom, (c) the totality of said plurality of troughs is cut to the shape of said vessel to fit thereto as the bottom thereof.

* * * * *